Feb. 2, 1937. T. GASKINS, JR 2,069,580
ARTICLE OF MANUFACTURE MADE FROM CYPRESS KNEE
Filed Aug. 10, 1936
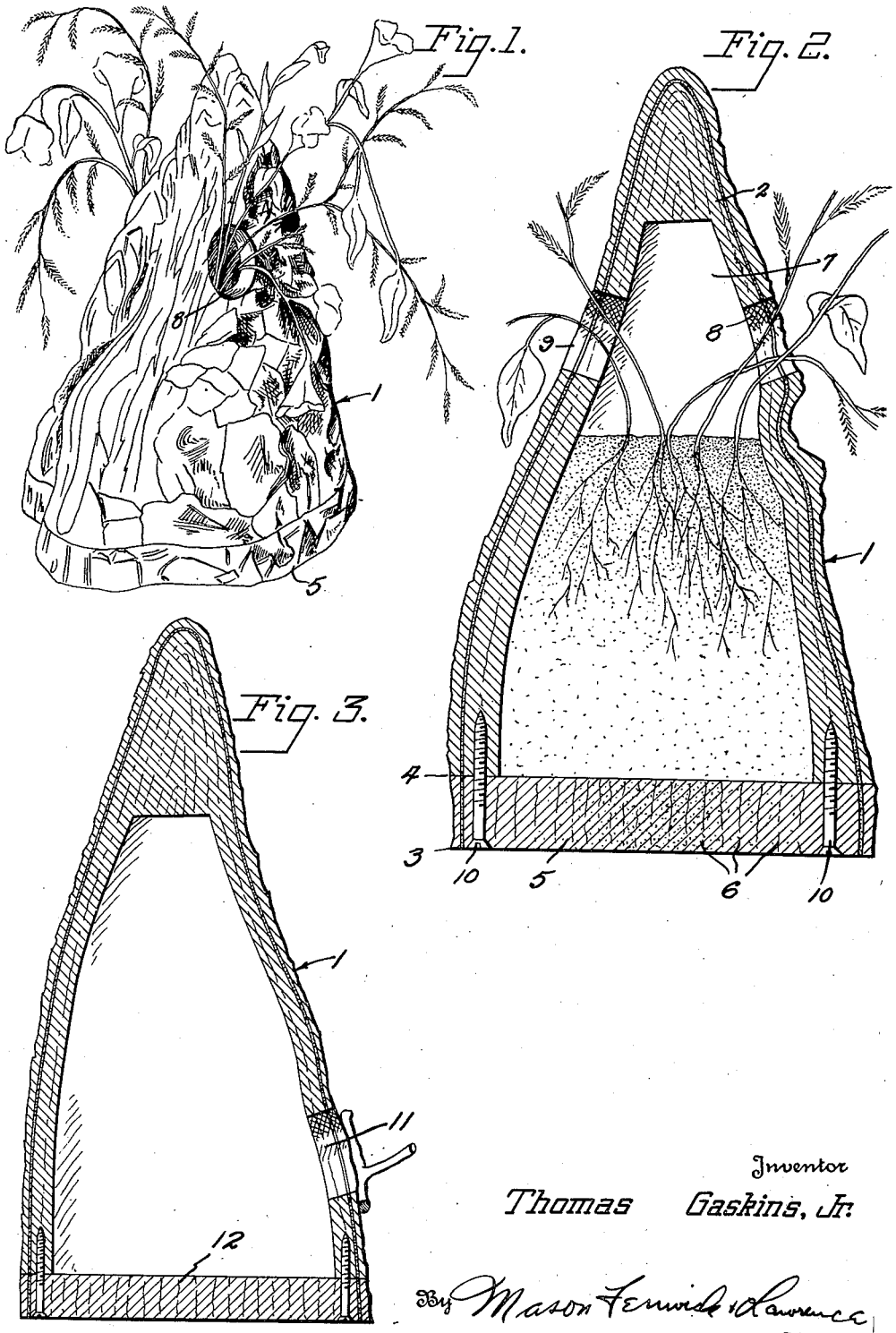
Inventor
Thomas Gaskins, Jr.
By Mason Fenwick & Lawrence
Attorneys Patented Feb. 2, 1937

2,069,580

UNITED STATES PATENT OFFICE 2,069,580

ARTICLE OF MANUFACTURE MADE FROM CYPRESS KNEE

Thomas Gaskins, Jr., Arcadia, Fla.

Application August 10, 1936, Serial No. 95,213

5 Claims. (Cl. 47—34)

This invention relates to an article of manufacture made from a cypress knee or like natural growth.

One of the objects of the invention is the production of a vase or pot for growing flowers, particularly designed for tropical or moisture-loving plants, which by its construction maintains a humid atmosphere above the soil in the pot and conserves the moisture of the soil itself.

Another object of the invention is the construction of a humidity-maintaining pot for growing flowers adapted to be watered from time to time by absorption through the bottom, the latter having a sponge-like capacity for water which makes it a water equalizer, absorbing moisture from the soil if the latter is made too wet and returning the moisture to the soil as it becomes dry.

Other objects of the invention will appear as the following description of a preferred and practical embodiment thereof proceeds.

In the drawing which accompanies and forms a part of the following specification and throughout the several figures of which the same characters of reference have been employed to designate identical parts:

Figure 1 is a perspective view of a flower vase or pot embodying the features of my invention;

Figure 2 is a vertical section through the same; and

Figure 3 is a modified form in which the aperture is adjacent the bottom of the knee.

Before referring in detail to the several figures, it may be stated that the cypress knee referred to in connection with the present invention is a woody excrescence or shoot emanating from the roots of the cypress tree, generally below the water level and characterized by the fact that while no two knees are of exactly the same shape or size, they have a general irregular conical contour, terminating in one or more rounded apices.

Botanically, in the growth and development of the knee, the cambium layer which produces the bark on the one hand and the wood on the other, determines the direction of the grain of the wood, which curves with the contour of the knee even at the apex, so that the knee may be hollowed out without the necessity of cutting across the grain or interrupting the continuity of the grain, excepting of course in the plane where the knee is severed from the roots of the tree.

The cypress knees are among a very few natural objects which have this character of growth and which makes them eligible for use in manufacturing the article of my invention.

Referring now in detail to the several figures, the numeral 1 represents in general a cypress knee, the layer 2 beneath the bark being extremely close grained and impervious. The knee was cut from the root of the tree along the plane 3 and a second cut was made along the plane 4 cutting off a solid slice 5 from the knee which is to serve as the bottom of the flower vase. As shown, the knee is resting upon its flat base and the grain in the slice 5 or bottom runs vertically, that is to say, in the direction indicated at 6. By contrast, with the outer layer of the wood which is as stated, quite hard, the inner part is soft and porous. This characterizes the bottom 5. In the manufacture of the article the bottom 5 is temporarily set aside and the knee hollowed out to form a chamber 7. This chamber opens in the base of the knee and converges toward the end or ends of the conical apices. Its walls follow the direction of the grain of the cut and care is taken that the grain is not cut since it is the object of the invention to make use of the impervious property of the knee in the functioning of the flower pot.

At suitable intermediate point or points openings 8 and 9 are made placing the chamber formed by the hollowing in communication with the exterior of the knee. These openings 8 and 9 roughly differentiate the within chamber into an upper and lower portion, the part beneath the holes being for the reception of the earth in which the flower is planted while the upper portion overlain by the apex and surrounding wall of the knee constitutes a humid chamber in which there is very little interchange between the enclosed air and that of the outside atmosphere. Particularly is this true when the plants have grown out of the openings 8 and 9 and have partly obstructed them.

There are several ways in which the earth can be placed in the pot and the flower planted. The bottom 5 is removable, being secured in any suitable manner as by the screws 10, and after it has been removed a mass of earth can be placed upon it, the flower planted, the earth shaped up a little so as to fit within the chamber of the knee and the knee is then placed in juxtaposition with the bottom and the screws refastened. If necessary, the earth can be compacted over the flower by reaching through the holes 8 and 9 with the fingers. The level of the earth is preferably made so close to the level of the openings that the plant does not suffer from dearth of sunlight during the brief time required for it to develop large enough to grow out of the openings 8 and 9.

It is obvious that the planted flower cannot be conveniently watered from the top or apex end of the knee and consequently, special and novel provision is made for watering the same. The bottom 5 with the exception of the marginal portion is soft and sponge-like in its capacity to absorb water and the direction of the cross grain 6 is such that if the pot is set in a shallow pan of water the water will be absorbed through the bottom and communicated to the mass of earth. Should it happen that the pot remains in the water too long and the mass of earth becomes too wet, the bottom 5 acts as a moisture equalizer for when the knee is lifted out of the water, excess will drain off through the porous texture of the bottom which will remain in saturated condition and re-supply moisture to the earth when the latter dries out. By varying the thickness of the bottom 5, any degree of moisture storing capacity may be imparted to it.

It will be apparent to those skilled that a flower pot constructed in the manner as above set forth simulates very closely the humid conditions of a tropical climate, facilitating the growing of exotic or moisture-loving plants. The hot sun never reaches the surface of the earth so that unless grossly neglected in the matter of water, it never dries out but remains mellow and moist. The heat beaming upon the impervious apical portion or portions of the knee evaporates a certain amount of the soil moisture which humidifies the air within the upper part of the chamber, and this air being restricted in its avenues of escape is retained within the flower vase providing humid conditions for the plant.

In Figure 3, I have shown a slightly modified form of the invention in which the structure is substantially identical with that which is described in connection with Figures 1 and 2, excepting that the hole 11 is closer to the bottom 12 and therefore provides a deeper dome above the hole 11 for the retention of the humid atmosphere.

The device of Figure 3 functions as a flower pot in exactly the same manner as the first described form of the invention. Both forms of the invention may be adapted to other uses. When not employed as flower pots they make excellent bird houses, either in their normal or inverted positions, the size of the holes being determined by the species of bird which it is desired to have occupy the house.

While I have in the above description disclosed what I believe to be a preferred and practical embodiment of my invention, it will be understood to those skilled in the art that the details of construction and the arrangement of parts as shown are merely by way of example and not to be construed as limiting the scope of the invention as defined in the appended claims.

What I claim is:

1. Flower pot comprising a knee having a closed apical end and a flat base, said knee being formed with a chamber extending toward said apical end an opening in said base, and a bottom of porous wood cut across grain, and with the grain running perpendicular to the plane of the base, said knee having an outlet aperture between the apical portion and base communicating with said chamber, and roughly determining an earth-receiving portion below said aperture and a humid atmosphere retaining portion.

2. Flower pot comprising a natural cypress knee characterized by having a roughly conical shape, a closed apical end, and by having the direction of the grain of the wood following the contour of the knee, said knee being cut to form a flat base and being hollowed to provide a chamber opening in said base and extending toward said apical end, the walls of said chamber following the direction of the grain, and a bottom of porous wood cut across grain, with the grain running perpendicular to the plane of the base, said knee having an outlet aperture between the apical portion and base communicating with said chamber and roughly determining an earth-receiving portion below said aperture and a humid atmosphere retaining portion.

3. Flower pot comprising a natural cypress knee characterized by having a roughly conical shape, a closed apical end, and by having the direction of the grain follow the contour of the knee, said knee being cut to form a flat base and being hollowed to form a chamber opening in the base and extending toward the apical end, the walls of said chamber following the direction of the grain, and a bottom secured to the open end of said knee made from a solid slice of said knee cut in a plane parallel to said base having the grain of the wood extending perpendicular to the plane of said base, said bottom constituting a porous member through which the contents of said pot may be watered and maintained moist through water absorbed by said bottom, said knee being provided with one or more flower outlet apertures intermediate the apical portion and the base communicating with said chamber and roughly determining an earth-receiving portion below said aperture and a humid atmosphere retaining portion.

4. Article of manufacture comprising a cypress knee characterized by having a roughly conical shape with one or more conical projections and having the grain of the wood follow the conical contour of said knee and its projections, said knee being cut in a plane substantially perpendicular to the grain of the wood, at a point remote from the conical projection or projections, forming a base, and being formed with a chamber opening in said base, the side walls of which are substantially parallel with the sides of the knee and therefore with the grain of the wood, and a closure composed of a cross cut slice of the same knee, congruently secured thereto in the plane of the base.

5. Article of manufacture comprising a cypress knee, a growth characterized by having a roughly conical shape with one or more conical protuberances, and having the cambium layer follow the conical contour even throughout the conical protuberance or protuberances, said knee being cut off in the cross grain direction in a plane remote from said protuberance or protuberances, and having a hollow extending from the plane of severance toward said protuberance or protuberances, restricted wholly to the region within said cambium layer, whereby an impervious vessel is produced.

THOMAS GASKINS, JR.